Figure 1:
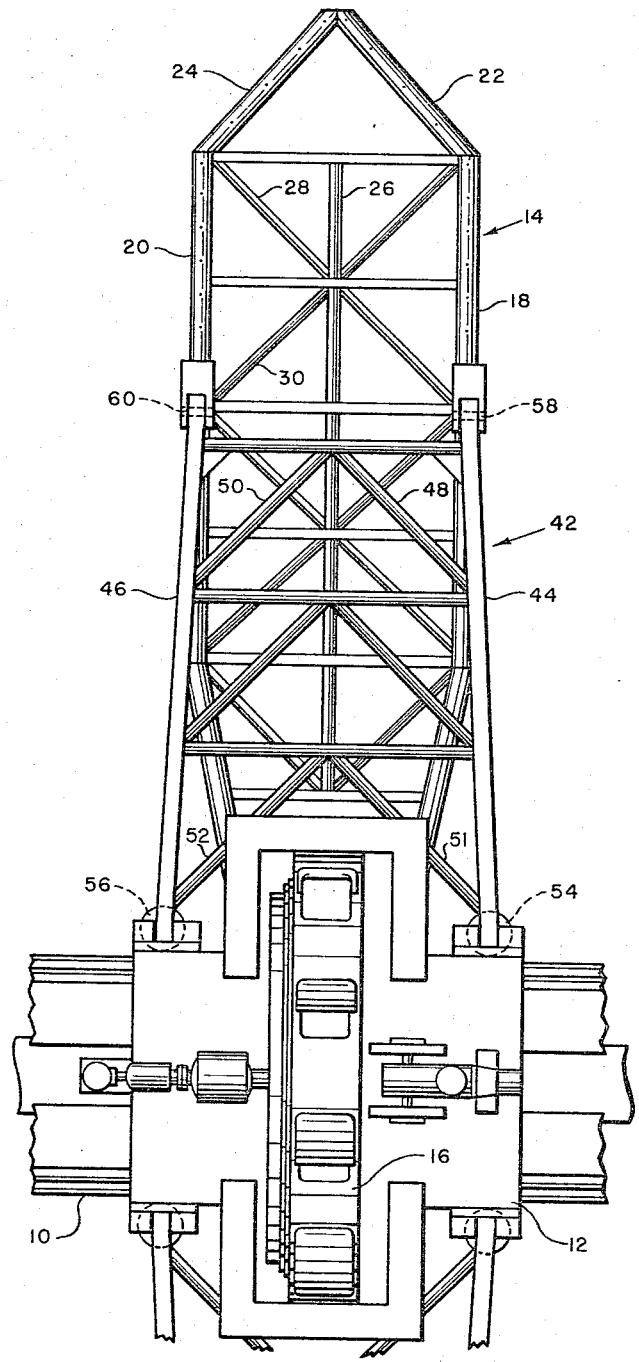

BY John L. Shortley

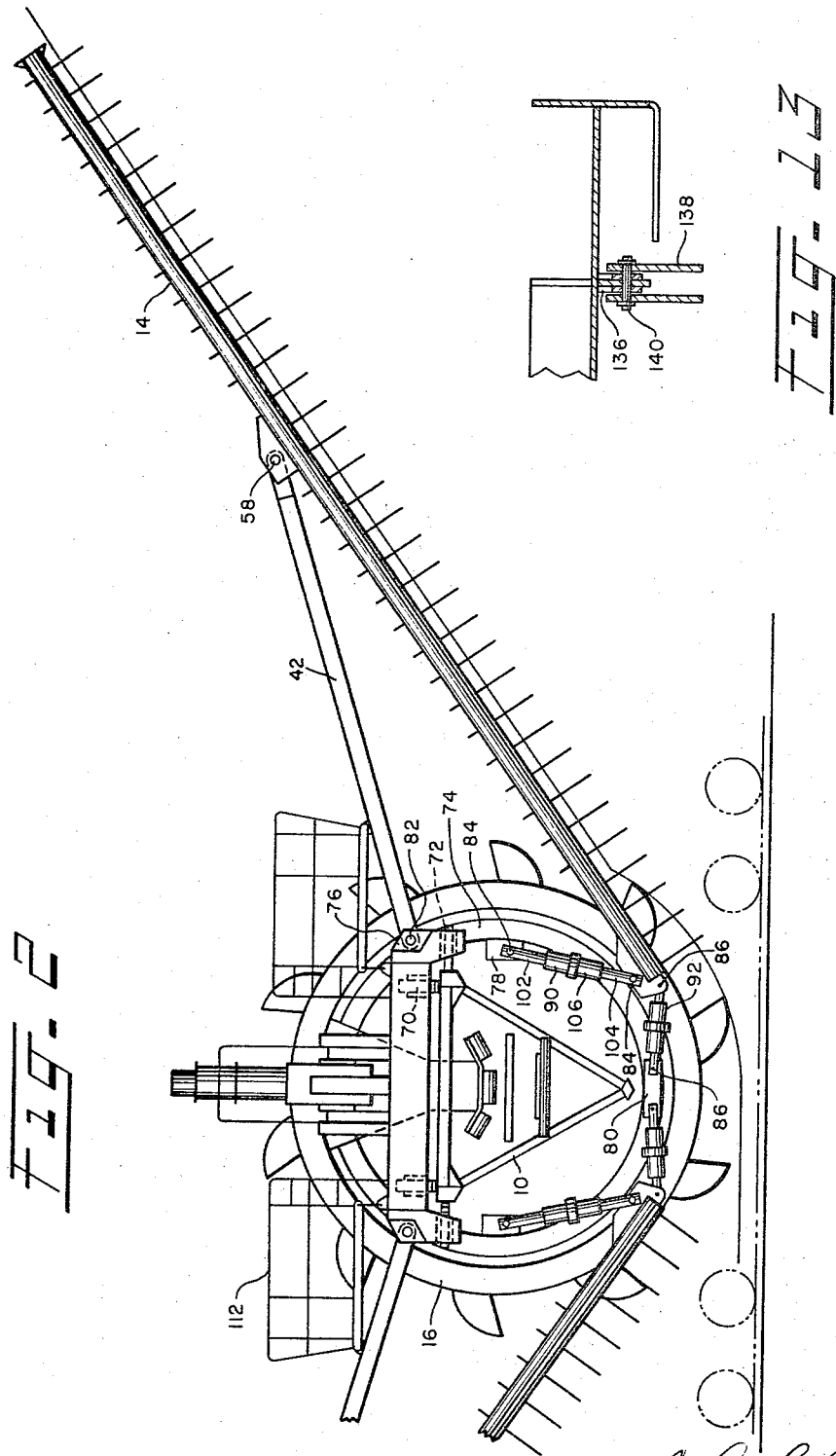

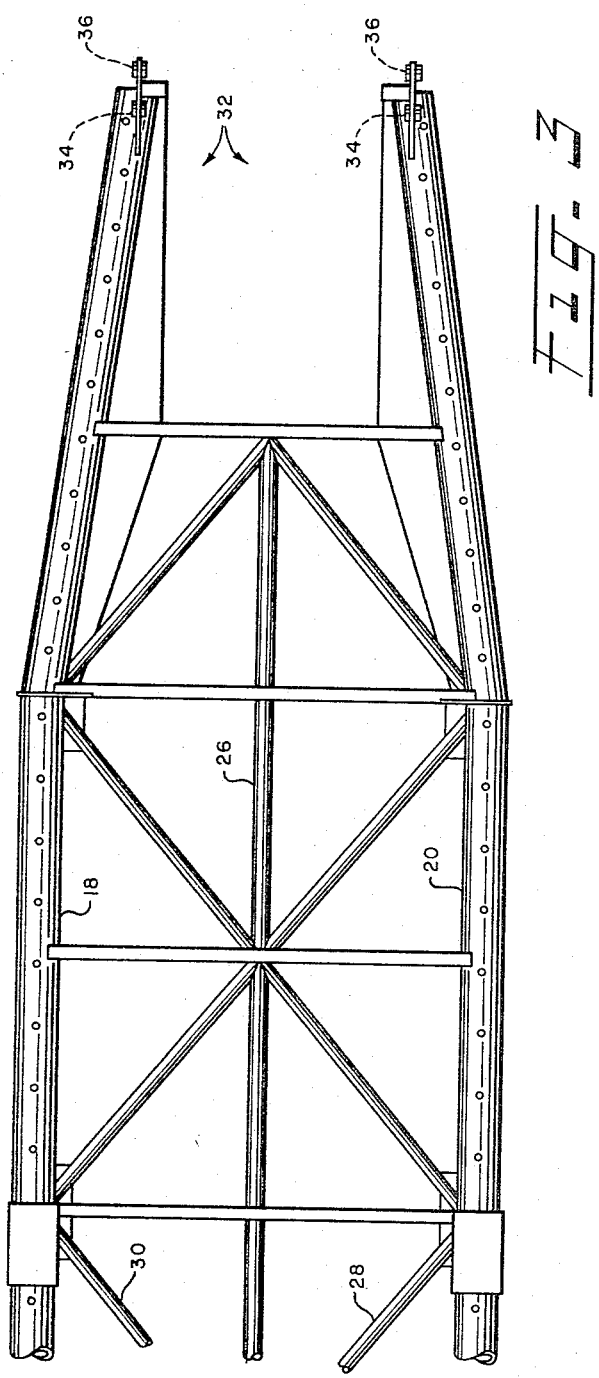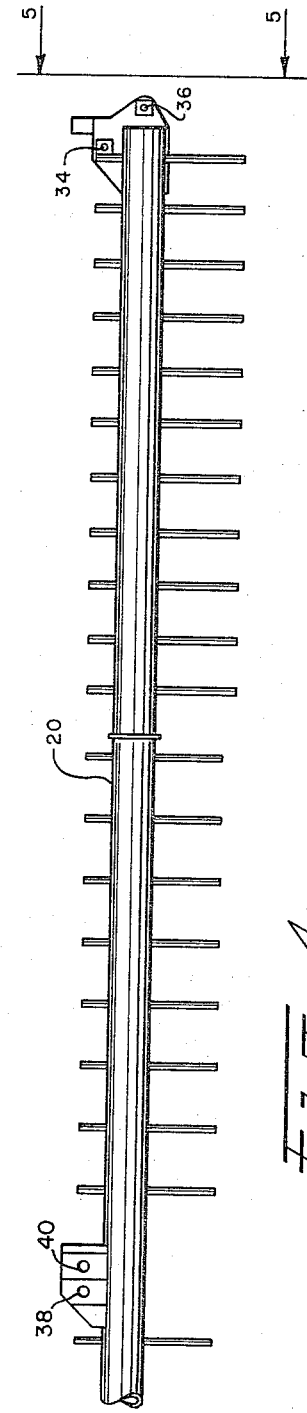

Feb. 27, 1968 W. WESTERBRINK 3,370,688
HARROW MOUNTING ON A RECLAIMER
Filed Feb. 17, 1966 5 Sheets-Sheet 5

John L. Shortley

United States Patent Office 3,370,688
Patented Feb. 27, 1968

3,370,688
HARROW MOUNTING ON A RECLAIMER
Wiebrand Westerbrink, Amsterdam, Netherlands, assignor to Hewitt-Robins Incorporated, Stamford, Conn.
Filed Feb. 17, 1966, Ser. No. 528,237
5 Claims. (Cl. 198—7)

This invention relates to a bucket type reclaiming machine wherein a bucket mechanism is mounted to traverse the face of a pile of bulk material to be reclaimed and wherein there is a harrow or rake associated with the wheel and the pile face. The purpose of the harrow is to control the slope of the face and to agitate the material on the face in a manner such that it will fall to the base of the pile face in a regulated manner. The bucket mechanism is designed to operate at the base of the face of the pile and lift the material onto a conveyor.

In particular this invention relates to a carriage structure and a mounting for the harrow used with such a machine, and wherein the harrow is mounted on a movable member such as a carriage. By the latter means the harrow is moved across the face of the pile as the bucket mechanism is also moved across the face of the pile. In particular, this invention relates to a mounting for a harrow whereby the harrow can be adjusted in position relative the pile face insofar as the slope is concerned and also wherein the toe or base of the harrow can be adjusted relative the area over the face on which the bucket digging mechanism sweeps and further wherein the means for supporting the harrow and adjusting it are reduced to a minimum size.

The invention further has an object of providing a point of support for the base of the harrow which is close to the carriage and wherein great stability can thereby be provided; i.e., by connecting the harrow substantially at its base directly to the carriage.

A further object of the invention is to provide a harrow supporting mechanism which has the above characteristics and wherein the amount of overhead structure is held to a minimum.

Yet another object is to eliminate the usual cable and equlizer structure that has been known in the art as a means for adjusting the slope of the harrow and supporting it in position.

Another object of the invention is to provide a harrow support which can be used in association with a carriage of reduced size as compared to that theretofore used.

Still another object is to provide a harrow support mechanism in association with the carriage which is substantially and entirely contained within the confines of a bucket wheel mechanism.

Yet a further object is to provide a means wherein the harrow support mechanism can be used as part of the support for a walk-way and a reduced size carriage mechanism can be used with the above designed harrow support and yet means are provided for passage from one side of the bucket mechanism to the other without building a carriage which extends in itself above the bucket mechanism.

Another object of the invention is to provide a carriage for supporting a harrow and bucket wheel which is also smaller and lighter than used heretofore.

It is also an object to provide a carriage which is of a size laterally of the reclaimer bridge less than that of the wheel diameter. A yet further object is to provide a bucket reclaimer in which the carriage is wholly within the periphery of the wheel with a walkway extending from one side of the carriage to the other side.

Figure 5:
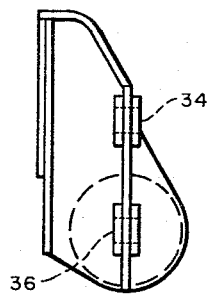
Figure 6:
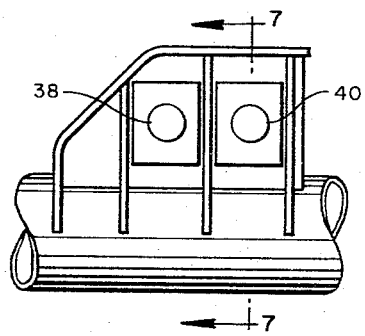
Figure 7:
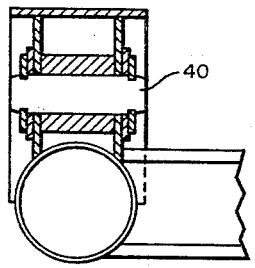
Figure 8:
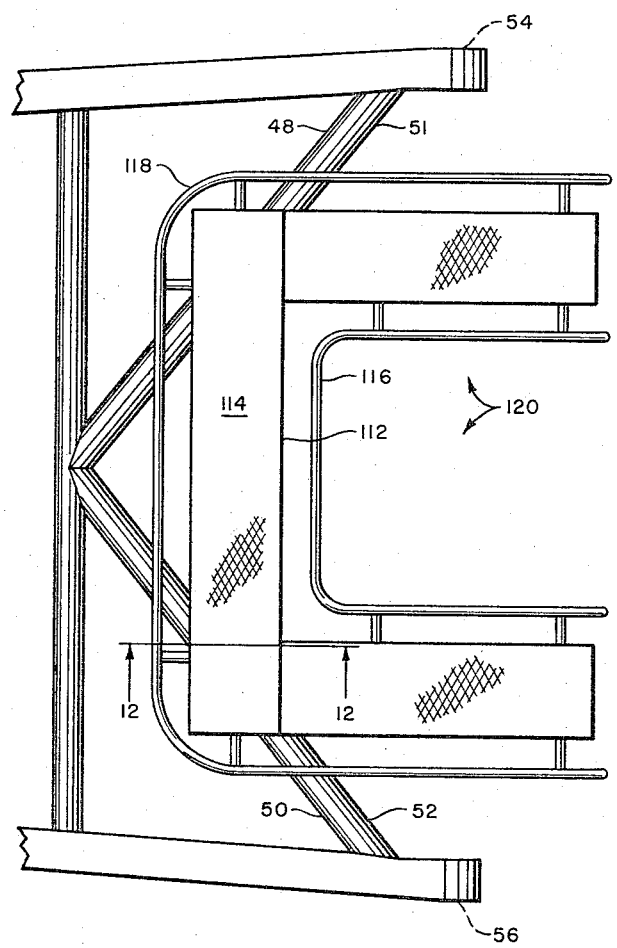
Figure 10:
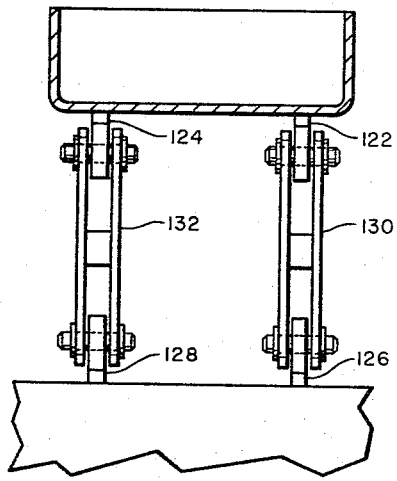
Figure 11:
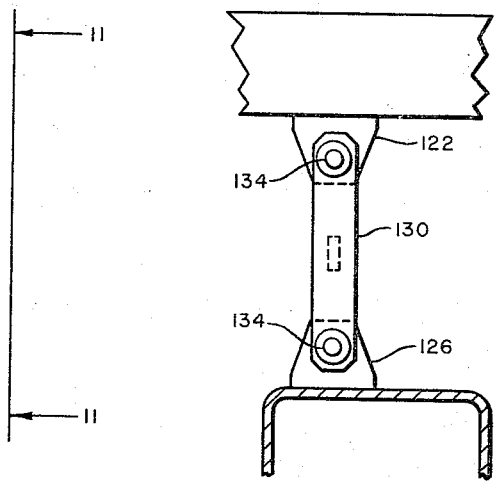
Figure 12:
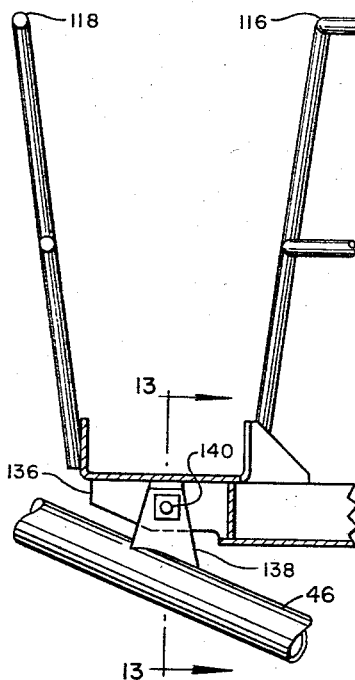
Figure 9:
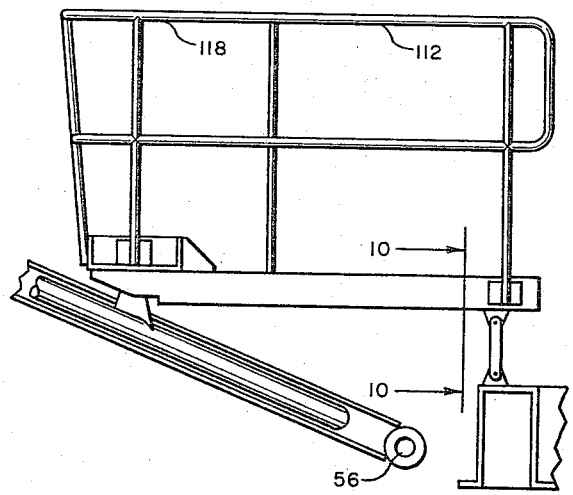

These and other objects and advantages will become apparent from the following description and the accompanying drawings wherein:

FIGURE 1 is a top plan view of a bucket reclaiming machine having a harrow as described heretofore.
FIGURE 2 is a side elevational view partly in section showing the bucket wheel reclaiming machine.
FIGURE 3 is a fragmentary plan view of the harrow.
FIGURE 4 is a side elevational view of the structure shown in FIGURE 3.
FIGURE 5 is a fragmentary end elevation along the line 5—5 of FIGURE 4.
FIGURE 6 is a fragmentary side elevation of a portion of the harrow arm showing part of the means for connecting a harrow to the carriage.
FIGURE 7 is a sectional view taken along lines 7—7 of FIGURE 6.
FIGURE 8 is a fragmentary top plan view of the harrow showing the walk-way supported thereon.
FIGURE 9 is a side elevation of the apparatus shown in FIGURE 8.
FIGURE 10 is a fragmentary sectional view taken along line 10—10 of FIGURE 9.
FIGURE 11 is a sectional view taken along line 11—11 of FIGURE 10.
FIGURE 12 is a sectional view taken along line 12—12 of FIGURE 8.
FIGURE 13 is a sectional view taken along line 13—13 of FIGURE 12.

Bucket-type reclaiming machines comprising a rotating bucket mechanism and a harrow used therewith have, in recent years, been receiving increased acceptance for reclaiming stock piles of bulk material.

It is known that the harrow of the reclaiming machine which functions to control the slope of the pile and also to agitate the material so that it falls down the slope in a controlled manner into a position to be dug by the bucket wheel, must be mounted in such a manner that it can be swept across the face of the pile, and in a manner such that it can be adjusted relative the pile to accommodate the changing needs for controlling the slope. It has been, in fact, found that it is most desirable to have means for not only adjusting the slope of the harrow but also for adjusting the toe; i.e., the base or bottom of the harrow mechanism relative the base of the pile so as to give better control of the material at the point where the bucket wheel digs into the base of the pile.

According to the instant invention, relatively rigid means are provided for supporting the harrow, and the cables and their attendant equalizing means and receiving devices are eliminated. Further the instant invention provides a more rigid support for the harrow. In addition the invention provides a harrow having its adjustment means at the base of the harrow wherein the members of the adjustment means are relatively short in length as compared to those heretofore employed. Yet another feature of the instant invention is that there is hereby provided a device wherein the "heel" of the harrow can be adjusted and the slope of the harrow can be adjusted by the same adjusting means. This eliminates one of the heretofore used adjusting devices. In heretofore known structures a separate means was employed for adjusting the slope and a separate means for adjusting the base of "heel" of the harrow.

Referring now in particular to the drawings, reference numeral 10 indicates a bridge and reference numeral 12 a carriage movably mounted on the bridge for traversing along the length thereof. The harrow is indicated by the numeral 14 and the bucket wheel device by the numeral 16. The reclaimer in this case includes a duplicate set of harrows and supporting mechanism therefore. However, since they are identical, only one will be described. The harrow comprises a number of frame elements. In this instance the harrow is formed of tubular side members 18 and 20, which are connected at their outer ends by similar members 22 and 24. The harrow further includes a tubular center member 26 which is substantially parallel to the side members 14 and 20 and braces such as 28 and 30. In the illustrated form the tubular members converge slightly adjacent the inner end of the harrow. At the latter location these tubular members extend along the sides of the bucket wheel with the opening 32 being provided in the harrow for receiving the bucket wheel. At its lower end, along each side, the harrow is provided with a pair of pivot pins receiving openings 34 and 36. These are supported in structural webs interconnected to the tubular members by suitable bracing as illustrated.

It will be obvious to those skilled in the art that many different forms of structure including reinforcing means can be used to properly position the pivot pin receiving openings 34, 36 on the tubular side rails 18 and 20. Approximately more than one-half the distance along its length from its inner end on each side of the harrow is provided with additional spaced opposing pin-receiving means 38 and 40.

Harrow arm 42 which is composed of spaced side members 44 and 46 and bracing members such as 48 and 50 is adapted to be pivotally connected adjacent both its ends to the harrow and the carriage respectively. As illustrated in FIGURE 8, the harrow arm also has its lower end open as illustrated at 51 and 52 so that it projects inwardly beyond the periphery of the bucket wheel to its point of connection to the carriage. The harrow arm is provided with spaced pivot receiving openings 54 and 56 adjacent its inner end and at its outer end the harrow arm side members have like pin receiving openings for receiving pins 58 and 60 (see FIGURE 2).

The carriage as known in the art supports the bucket mechanism of the harrow and in the instance illustrated provides the support for portions of the driving mechanism which function to move the carriage back and forth along the bridge 10. The wheels 70 and 72 which cooperate with rails to support and stabilize the carriage on the bridge 10 are also mounted on the carriage. In this instance the carriage comprises a frame having a portion 74 which directly supports the rotatable bucket wheel 16 for relative rotation. In the illustrated device, and preferably, the rotation of the bucket wheel is substantially in a vertical plane.

The carriage has spaced pivot supports 76 and 78. Also, at approximately the bottom of the frame, as referred to herein, there is an additional pivot bracket 80 connected to the carriage frame. It should be understood that these, like the pivot supports 76, are duplicated by members on each side of the bucket wheel rim; i.e., on each side of the frame which supports the bucket wheel. These pivot brackets each mount pivot pins such as 82, 84 and 86. Support link 90 has one of its ends pivotally connected to the opening 34 in the lower end of the harrow by a suitable pin. Likewise, the support link 92 has one of its ends pivotally connected to a pin received within the opening 36. These support links 90 and 92 have their opposite ends respectively connected to the pins 84 and 86 received in the openings 34 and 36 on the harrow 14. Thus the links 90 and 92, pivotally support the lower end of the harrow and together with the harrow arm provide the means for pivotally connecting the harrow to the movable carriage in such a manner that the harrow can be swept across the face of the pile of material to be reclaimed.

Each of the links 90 and 92 are in the form of screwjacks; i.e., they consist of a pair of arms 102, 104 each connected by screw threads to a sleeve 106. This sleeve is provided with a means for rotating it which can comprise a sprocket affixed to the sleeve and engaged with a worm adapted to be operated by a wrench. Power operated jacks can obviously be used instead of those illustrated.

It will be apparent that the screw-jack links provide a means for rigidly connecting the base of the harrow to the carriage in close association with the carriage and in addition provide a means for both pivoting the harrow about the pins 82 connecting the inner ends of the harrow arms to the carriage and for adjusting the toe, the base, of the harrow relative the pile. Thus the slope of the harrow can be changed and also the harrow toe position for each slope can be adjusted by a combination of movements of the four jacks positioned at the base of each harrow.

It will be noticed that the carriage frame does not extend beyond the periphery of the bucket wheel. As is known in the art, it is often desirable to inspect the equipment and in the form of the apparatus shown this is usually accomplished by climbing up a ladder onto the bridge and walking to the carriage or climbing up onto the carriage itself by means of a ladder connected to the carriage. In many of the heretofore known constructions it is possible to walk on the carriage from one side of the wheel to the other. This is possible because the carriage extends over the top of the wheel. In this instance, however, the carriage is reduced in size and it is not possible to walk on the carriage itself from one side of the wheel to the other. In order to make it possible to move from one side of the wheel to the other for examining the equipment for any lubrication checks, etc., without excessive climbing up and down, a walk-way 112 having a walk platform 114 (see FIGURES 2, 8 and 9) and inner and outer rails 116 and 118 is provided. This walk-way, it will be noticed, extends around the periphery of the bucket wheel and has a bucket receiving opening 120 therein. The walk-way is pivotally connected to the carriage adjacent each of its ends and to the harrow arm adjacent its outer edge. As illustrated in FIGURES 10 and 11 the walk-way at each of its ends, of the sides which are positioned over the carriage, is provided with depending brackets 122 and 124. Like brackets 126 and 128 are secured to the carriage and links 130 and 132 pivotally interconnect these brackets. The pins 134 are provided for this purpose.

Adjacent the outer end the platform is provided with a pair of depending brackets 136. These are connected to brackets 138 on the arms 46 by means of pins 140. The rails 116, 118 and their supporting posts of suitable pipe sections are secured to the walkway by welding.

It will be apparent that the walkway thus provides a safe means for observing the action of the wheel and its driving mechanism and for walking from one side of the bucket wheel to the other.

From the above it will be apparent to those skilled in the art that there is provided a means for securely positioning a harrow in association with a moving carriage and preferably directly in association with a bucket wheel wherein the cable and equalizing structure and drive for the cable formerly employed are eliminated, wherein the amount of overhead structure of the carriage is decreased and wherein the base of the harrow is provided with a rigid yet adjustably positioned pivot closely adjacent to the supporting carriage frame work, and wherein a simple and accurate means of adjusting the slope and the base of the harrow is provided. There is further provided a carriage of smaller size, yet the harrow is even more satisfactorily suspended.

While a preferred form of the invention has been described, it will be understood by those skilled in the art that many forms of the above may be made within the scope of the appended claims, and accordingly we claim an exclusive right to all which come within the scope of the appended claims.

I claim:

1. A digging reclaimer, having a harrow and a bucket mechanism for moving material from a storage pile wherein the harrow is adapted to be operated in association with the wheel so as to sweep the face of a pile of material to be reclaimed and wherein the harrow is associated with a carriage and there are means provided for adjusting the slope of the harrow and the heel of the harrow characterized by the fact that the harrow is connected to the movable carriage by an arm, said arm being pivotally connected adjacent its respective ends to the carriage and to the harrow, the latter connection being at a substantial distance from both ends of the harrow, and the heel of the harrow is pivotally connected to a pair of link members, said link members in turn are pivotally connected to said carriage; said link members being adjustable in length to effect adjustment of the slope of said harrow and the position of the heel of said harrow relative said carriage.

2. The reclaimer of claim 1 wherein said link members comprise screw-jacks.

3. The reclaimer of claim 1 wherein said link members are disposed substantially at right angles to each other adjacent their point of connection to the heel of the harrow and operation of one of said link members to lengthen or shorten it causes pivotal movement of the harrow approximately about the point of pivotal support of the other link member to said carriage.

4. The reclaimer of claim 1 wherein there are a pair of said link members adjacent each side of said harrow connected to the heel thereof, which are adjustable in length whereby the slope of said harrow and the position of the heel of said harrow can be adjusted relative said carriage.

5. The reclaimer of claim 1 including a walkway pivotally connected to said carriage and projecting outwardly thereof, the walkway extending around said bucket mechanism and being supported in part by said carriage and in part by said arm.

References Cited
UNITED STATES PATENTS 2,820,553   1/1958   Finney et al. _____ 214—10
3,240,362   3/1966   Erhardt _____ 214—10

GERALD M. FORLENZA, *Primary Examiner.*

F. E. WERNER, *Assistant Examiner.*